No. 787,774. PATENTED APR. 18, 1905.
J. F. LAMB.
MIXING VESSEL AND CLAMP.
APPLICATION FILED AUG. 15, 1904.
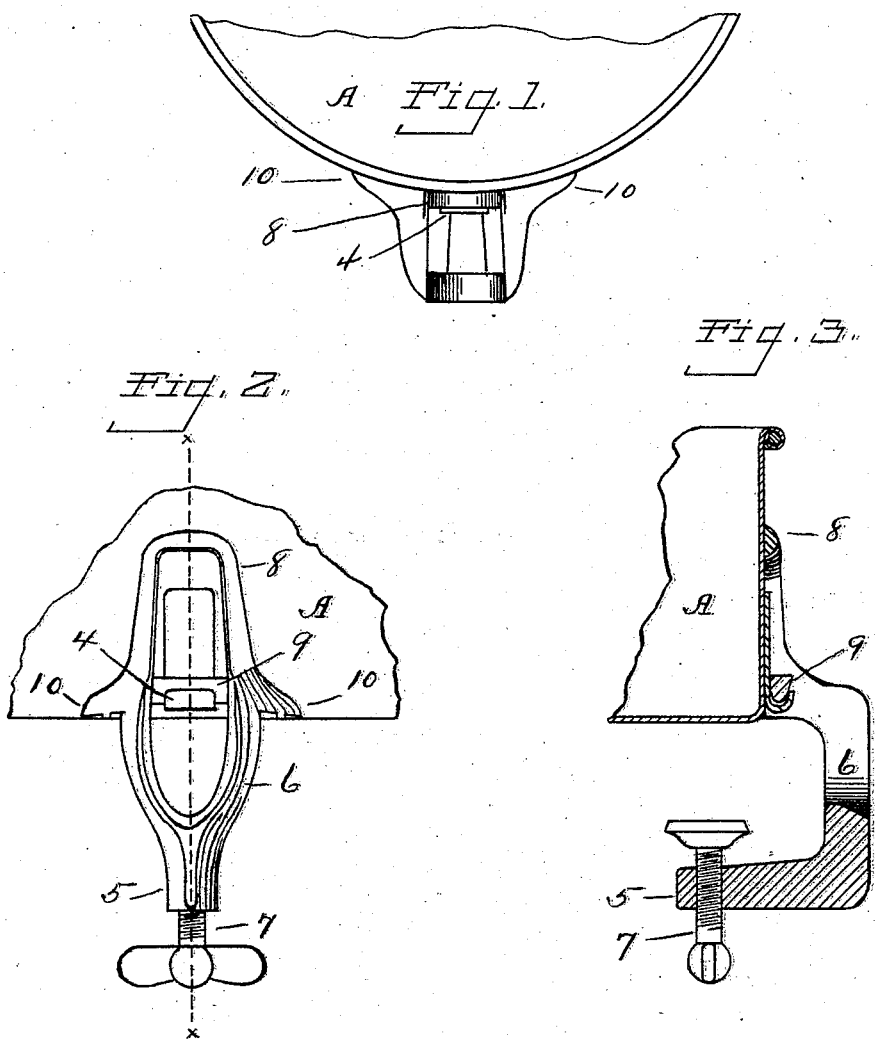

No. 787,774.

Patented April 18, 1905.

UNITED STATES PATENT OFFICE.

JOSEPH F. LAMB, OF NEW BRITAIN, CONNECTICUT, ASSIGNOR TO LANDERS, FRARY AND CLARK, OF NEW BRITAIN, CONNECTICUT, A CORPORATION.

MIXING VESSEL AND CLAMP.

SPECIFICATION forming part of Letters Patent No. 787,774, dated April 18, 1905.

Application filed August 15, 1904. Serial No. 220,715.

*To all whom it may concern:*

Be it known that I, JOSEPH F. LAMB, a citizen of the United States, residing at New Britain, in the county of Hartford and State of Connecticut, have invented certain new and useful Improvements in Mixing Vessels and Clamps, of which the following is a specification.

My invention relates to improvements in mixing vessels and clamps for the same; and the object of my improvement is to provide simple and efficient means for fastening a mixing vessel to a bench or table.

In the accompanying drawings, Figure 1 is a plan view of a portion of my mixing-vessel and a clamp applied thereto. Fig. 2 is an elevation of the same; and Fig. 3 is a section of the same on the line $x\,x$ of Fig. 2, the clamping-screw being in elevation.

A designates a portion of a cylindrical metal vessel with a flat bottom, the same constituting a mixing vessel for use in making cake. In such vessels for mixing cake or dough an agitator is employed, and it is desirable to provide means to firmly secure the vessel to a bench or table to hold it while the agitator is operated. Various devices have been provided for this purpose, and hence it is only the aim of the present invention to simplify the construction and at the same time produce an efficient article. The only change made in the vessel is to secure to one side thereof near the bottom a hook 4, with its mouth or throat facing upwardly. This hook constitutes a keeper for being engaged by the holding portion of the clamp.

The lower arm 5 of the clamp and its upright 6 together with an ordinary clamp-screw 7 in the said lower arm are mainly of an old and well-form. The rest of the clamp is of a special construction and consists of an upwardly-extended open member 8, having a holding portion or cross-bar 9 near its lower end, and a curved base 10, that extends laterally from each end of the cross-bar 9 and furnishes a wide bearing for engaging the outer cylindrical side of the vessel near the bottom at both sides of the clamping-hook and to some distance therefrom. The body of the upwardly-extended open member 8 and the curved base 10 constitute holding portions other than the holding portion 9, which engages the keeper, which other holding portions are for engaging the side of the vessel at points outside of or beyond the keeper to assist in firmly holding the vessel in place. The under face of the base 10 is designed for resting on the top face of the table or bench. The hook 4 is preferably made of heavy but somewhat resilient metal, and the cross-bar is fitted thereto wedge fashion—that is to say, the cross-bar is tapering in cross-section and is a little thicker than the mouth of the hook, so that when first placed therein, as shown in Fig. 3, it does not strike the bottom of the hook.

The clamp is placed on the vessel with its cross-bar in the mouth of the hook, as shown, and the vessel and clamp may be placed on a bench or table with the clamping-screw under the table. Turning up the screw pulls the vessel snugly down against the top of the table and the spring-hook will yield a little and also let the bottom face of the curved base down on the top of the table so as to fasten the vessel and clamp both firmly in place with the vessel always held down under the tension of the hook, so that there is no liability of the clamp being bound firmly to the table in such a way as to leave the vessel loose thereon. Besides this, the upwardly and laterally extended members embrace the vessel for a considerable height and width on lines extending along the side of the vessel in three different directions from the center of the keeper at a point slightly above the bottom of the vessel, the laterally-extended member being in the form of a curved base for engaging the side of the vessel and top of the table below the plane of the engaging faces of the keeper and clamp, so that the vessel is firmly held even when made of sheet metal, as most of such vessels are.

The keeper and clamp are so formed that the clamp is presented laterally to the side of the vessel with the holding portion 9 of the clamp above the keeper and then lowered into engagement with the keeper. The shouldered feature of the keeper necessitates seating the members 8 and 10 firmly against the side of the vessel when the keeper and holding portion 9 are in engagement with each other, whereby the clamp is supported in position on the side of the vessel, as shown, ready to secure the vessel and clamp to a table or bench.

I claim as my invention—

1. The herein-described vessel and clamp consisting of the vessel with the upwardly-presented open-mouthed hook secured to the side of the said vessel near the bottom and the screw-clamp having the upwardly-extended and open member, the cross-bar within the said member for engaging the said hook, and the curved base, the said base and upwardly-extended member being fitted to engage the side of the vessel as set forth.

2. The combination of a vessel having substantially vertical sides, a bottom face designed to rest upon a suitable support and a keeper above the said bottom face, with a detachable clamp having a holding portion for engaging the said keeper, a member for engaging the side of the vessel and in connection with the said holder acting to prevent the vessel from tipping when the clamp draws the vessel toward its support, and a member for engaging the side of the vessel and in connection with the said keeper acting to prevent the vessel from twisting on the clamp, the said keeper and its holder also having means for necessitating the engagement of the said two members with the side of the vessel when the clamp is put in place thereon.

JOSEPH F. LAMB.

Witnesses:
J. H. KEITH,
O. N. JUDD.